UNITED STATES PATENT OFFICE.

ALONZO C. CAMPBELL, OF NEW YORK, N. Y.

IMPROVEMENT IN ASPHALT PAVEMENTS.

Specification forming part of Letters Patent No. 108,566, dated October 25, 1870.

*To all whom it may concern:*

Be it known that I, ALONZO C. CAMPBELL, of the city of New York, in the county and State of New York, have invented a new and Improved Asphalt Pavement; and I do hereby declare that the following is a full, clear, and exact description thereof, which will enable others skilled in the art to make and use the same.

The nature of my invention consists in a new and improved mode of mixing asphaltum or any other asphaltic preparation with mineral matter, or with rocks crushed or pulverized, or with any pulverulent earth, as clay, marl, &c., with the object of bringing about a more thorough union of the materials, and thereby forming a more suitable product for paving streets, sidewalks, &c., and for flooring, and for other purposes.

I add to the finely-divided mineral matter water in quantity sufficient to form a mortar, and subject it to a boiling heat, or expel the excess of water, and at the same time all inclosed air. When the mortar or the silt has been reduced by evaporation to the proper degree of stiffness (which will depend upon the fluidity of the asphalt) it (the mortar) is added, part at a time or all at once, to the previously-melted asphalt, and the two portions then thoroughly mixed to a homogeneous black or a brown mass, which latter must then be subjected to evaporation until all of the water has been expelled, leaving the asphaltum thoroughly combined with the mineral powder.

The invention further consists in making the wet asphaltic mortar into bricks or other forms, and then drying them in a kiln at comparatively a moderate heat or in air-drying them.

To enable others to make use of my improvements, I will describe the manner in which the operation may be conducted.

In order to simplify the description I will bring it under the following heads: first, materials; second, preparation of materials; third, mixing; fourth, drying; fifth, application.

Materials.

I would prefer limestone to form the skeleton-like support to the asphaltic body, and I should select a kind that is not very crystalline, because the crystalline limestone cannot with sufficient ease be reduced to a fine powder. Regarding the asphaltic preparation, I prefer to use Trinidad asphaltum softened by the French mineral tar; yet, in some cases, desired economy may demand the use of other materials.

Any asphaltic preparation may be used that will admit, under varied circumstances, of being mixed after the manner of my particular method with any mineral or rock powder.

Preparation.

Whatever kind of mineral material may be preferred, it must be brought to a fine state of division, if not already in powder. After the rock has been coarsely crushed, it may be ground by means of an ordinary burr-mill. The rock may be ground dry or wet, depending on which method will afford the best result, considering time, quality, ground, and the character of the product. If the powder is kept in store some time before use, it would be better to keep it wet with water in order to insure its perfect saturation.

When using Trinidad asphaltum and French tar, I have found it better to first melt the Trinidad asphaltum, and then add the mineral tar and stir them together. I think it preferable to adopt for general use about two parts of Trinidad asphaltum to one part of the French tar; yet a smaller or larger proportion of the latter may be used if the case should demand it. Trinidad asphaltum softened with petroleum gives a very good result. The lighter hydrocarbon oils evaporating with the water leaves a thick non-volatile solvent, which is strongly retained by the Trinidad asphaltum.

Mixing.

Any properly-tempered asphaltum will easily mix in all proportions with the wet mortar of pulverized limestone, or of other powder; but if the wet asphaltic mortar is to be evaporated rapidly, I prefer to obtain a loose sticky powder after all of the water has been expelled. This can be regulated by varying the proportion of asphalt. If too little asphalt be used the powder will be dry and dusty. On the other hand, if too much be used the product will be sticky, and will collect into large lumps, which are difficult to manage. Generally about twenty per cent. of asphalt will afford the best result.

If the wet asphaltic mortar is kiln-dried or air-dried, of course the difficulty of mixing the drying mortar is avoided, and a large proportion of asphalt may be used. The silt, of ground limestone or its equivalent, may be boiled in a large open sheet-iron receptacle to a plastic mortar, when the previously-melted asphalt may be added to the mortar, and the mixing carried on by means of shovels, hoes, or such tools as are used for mixing ordinary mortar. In fact, any contrivance that may be used for this latter purpose may, with equal advantage, be applied to the mixing of asphaltic mortar, only it would be preferable to maintain the materials at a temperature that would allow of a more complete and rapid penetration of the asphalt throughout the mass.

Drying.

The asphaltic mortar may be dried rapidly over a hot fire. It may be dried slowly at a moderate temperature, kiln-dried, or it may be air-dried.

If the first method be used, the drying may be carried on in the same receptacle in which the asphaltic mortar was made. After nearly all of the water has been evaporated (which can be told by the appearance of white hydrocarbon fumes) the heat of the fire must be moderated to prevent the asphalt from scorching. If to be kiln-dried, the wet asphaltic mortar may be made into bricks and conveniently stacked in a kiln, and subjected at first to an atmospheric temperature of about 250° to 300° Fahrenheit, but finally to about 212° Fahrenheit, and lower until all of the water has been evaporated, and then allowed to slowly cool, when they may be removed.

The temperature most suitable for drying the bricks will of course vary with the fusibility and volatility of the hydrocarbon. The fresh bricks may be air-dried in a way similar to that used for drying ordinary clay bricks.

Application.

The above-described asphaltic preparations may be applied to the use for which they were intended without their further alteration. The product from the rapid drying may be applied while hot, in the form of powder, to the surface to be covered, and then compressed by dampers and rollers. The kiln-dried or air-dried bricks may be used and applied as bricks ordinarily, only it would be preferable to cement the joints with a melted asphalt. In many cases the wet asphaltic mortar may be applied previously to its being dried; but it would be necessary to protect it from wear and tear until thoroughly dried, and then compressed with a hot roller.

If the bricks are to be laid for sidewalks or similar purposes, it would be better for them to contain about one-third or one-fourth asphaltum.

I may add to the water, previously to its being made into mortar with the mineral powder, any salt, acid, or vulcanizing or other reagent that may act beneficially; but I prefer to use it as above described.

Having thus described my invention, I claim as new and desire to secure by Letters Patent—

1. The combination of mortar and melted asphalt, or asphaltic preparation, the mortar being composed principally of water and any finely-divided mineral matter.

2. The removal of the water from the combined asphalt and mortar by the several methods substantially as herein described.

3. The improved paving material, whether in bricks or other form, prepared and applied substantially as herein set forth, as an improved article of manufacture.

ALONZO C. CAMPBELL.

Witnesses:
  GEO. W. MABEE,
  ALEX. F. ROBERTS.